United States Patent [19]

Thakkar

[11] Patent Number: 5,512,089
[45] Date of Patent: Apr. 30, 1996

[54] PROCESS OF MAKING AQUEOUS PIGMENTED INK-JET INK WITH IMPROVED MACHINE RUNNABILITY

[75] Inventor: Sharad R. Thakkar, Dayton, Ohio

[73] Assignee: Scitex Digital Printing, Inc., Dayton, Ohio

[21] Appl. No.: 294,889

[22] Filed: Aug. 23, 1994

[51] Int. Cl.⁶ .................................................. C09D 11/02
[52] U.S. Cl. .................... 106/20 R; 106/20 C; 106/20 D
[58] Field of Search .............................. 106/20 R, 20 D, 106/23 R, 23 H, 20 C, 23 C

[56] References Cited

U.S. PATENT DOCUMENTS

| | | | |
|---|---|---|---|
| 4,255,754 | 3/1981 | Crean et al. | 346/75 |
| 4,365,035 | 12/1982 | Zabiak | 106/20 C |
| 4,698,123 | 10/1987 | Link et al. | 156/634 |
| 4,751,517 | 6/1988 | Crean et al. | 346/75 |
| 4,959,661 | 9/1990 | Buxton et al. | 106/23 C |
| 5,104,449 | 4/1992 | Pavlin | 106/30 R |
| 5,106,417 | 4/1992 | Hauser et al. | 106/20 D |
| 5,310,778 | 5/1994 | Shor et al. | 106/20 D |
| 5,320,668 | 6/1994 | Shields et al. | 106/23 R |
| 5,358,555 | 10/1994 | Argentero et al. | 106/20 D |
| 5,407,474 | 4/1995 | Airey et al. | 106/20 C |

Primary Examiner—Helene Klemanski
Attorney, Agent, or Firm—Barbara Joan Haushalter

[57] ABSTRACT

An ink jet ink composition comprises a liquid vehicle, a pigment, and a base for raising the pH of the system. The problem to be addressed for pigmented inks is how to achieve excellent ink redispersibility within a short time period, usually within 1–2 minutes, without any mechanical agitation. With the present invention, dried ink redispersibility/charge plate deposit redispersibility of aqueous pigmented ink is improved by raising the pH of the ink, for example, between 9 and 12. The time required for dried ink redispersibility is then reduced from greater than 10 minutes to an acceptable 1–2 minutes. The present invention results in significant improvement in machine runnability and can, therefore, be used in ink jet printers.

17 Claims, 4 Drawing Sheets

PROCESS OF MAKING AQUEOUS PIGMENTED INK-JET INK WITH IMPROVED MACHINE RUNNABILITY

TECHNICAL FIELD

The present invention relates to aqueous liquid inks and, more particularly, to a process for formulating aqueous pigmented ink for use in continuous ink jet printers.

BACKGROUND ART

In continuous ink jet printing, ink is supplied under pressure to a manifold region that distributes the ink to a plurality of orifices, typically arranged in a linear array(s). The ink discharges from the orifices in filaments which break into droplet streams. The approach for printing with these droplet streams is to selectively charge and deflect certain drops from their normal trajectories. Graphic reproduction is accomplished by selectively charging and deflecting drops from the drop streams and depositing at least some of the drops on a print receiving medium while other of the drops strike a drop catcher device. The continuous stream ink jet printing process is described, for example, in U.S. Pat. Nos. 4,255,754; 4,698,123 and 4,751,517, the disclosures of each of which are totally incorporated herein by reference.

In the ink jet printing art, water soluble dyes are desirable for runnability. However, waterfast inks are highly desirable for producing permanent images. Decreasing the solubility of the dye increases the waterfastness, and vice versa. One means for improving waterfastness is to use polymers and resins in inks to enhance adhesion of the dye to substrates. However, presence of resins in inks adversely affects machine runnability due to formation of deposits on orifice plates and charge plate buildup. It is also known to use amines in dye based inks, which are water soluble, for the purpose of making salts.

In the continuous ink jet industry, desire to obtain permanent ink (near 100% waterfastness) has been in existence for some time. Although this has been achieved by some continuous ink jet manufacturers (EJ-101 ink by Elmjet, VT-16-2000 ink by Videojet and Admark Fast Black Ink by Eastman Kodak Company), it utilizes non-aqueous solvents which, in some cases, are hazardous. Hence, ideally, industry would prefer an aqueous ink which would provide near 100% waterfastness. Current state-of-the-art aqueous ink jet inks utilize water soluble dyes to attain acceptable redissolvability of the dried ink on the orifice plate. This redissolvability is essential for good machine runnability as well as start-up for continuous ink jet printers which do not have a separate printhead cleaning fluid mechanism.

It is seen then that there is a need for improved waterfast ink for use in continuous ink jet recording equipment.

SUMMARY OF THE INVENTION

This need is met by the waterfast ink composition according to the present invention, which is a process of making pigmented (rather than conventional dye-based) aqueous ink jet ink which provides near 100% waterfastness. The pigmented aqueous ink jet ink of the present invention achieves essential dried ink redispersibility/charge plate deposit redispersibility to gain improved machine runnability. By raising pH of the ink between 9 to 12, dried ink redispersibility time is reduced from greater than 10 minutes to between 1–2 minutes without any mechanical agitation. The use of amines in carbon pigments is completely novel and non-obvious, since there are no salts with carbon pigments.

In accordance with one aspect of the present invention, an ink jet ink composition comprising a liquid vehicle, a pigment, and a base for raising the pH of the system between 9 and 12. Dried ink redispersibility/charge plate deposit redispersibility of aqueous pigmented ink formulated in accordance with this composition improves machine runnability by raising the pH of the ink. The present invention, then, results in significant improvement in machine runnability of an ink jet printing system.

Other objects and advantages of the invention will be apparent from the following description and the appended claims.

DETAILED DESCRIPTION OF THE INVENTION

The present invention provides for a waterfast ink composition wherein the ink is a pigmented, rather than a conventional dye-based, aqueous ink jet ink which provides near 100% waterfastness. One of the main concerns in going from conventional dye based ink jet inks to pigmented inks is the possibility of clogging the fine printhead orifices by pigment particles. Even minimal clogging could be sufficient to create ragged jets which then requires shutdown of a printer. Even with very fine particle size pigment dispersion (100% particles below 0.3µ measured by Microtrac UPA), the printhead resonator will show ragged jets within first few minutes, without the use of prefilters.

Figure 1:
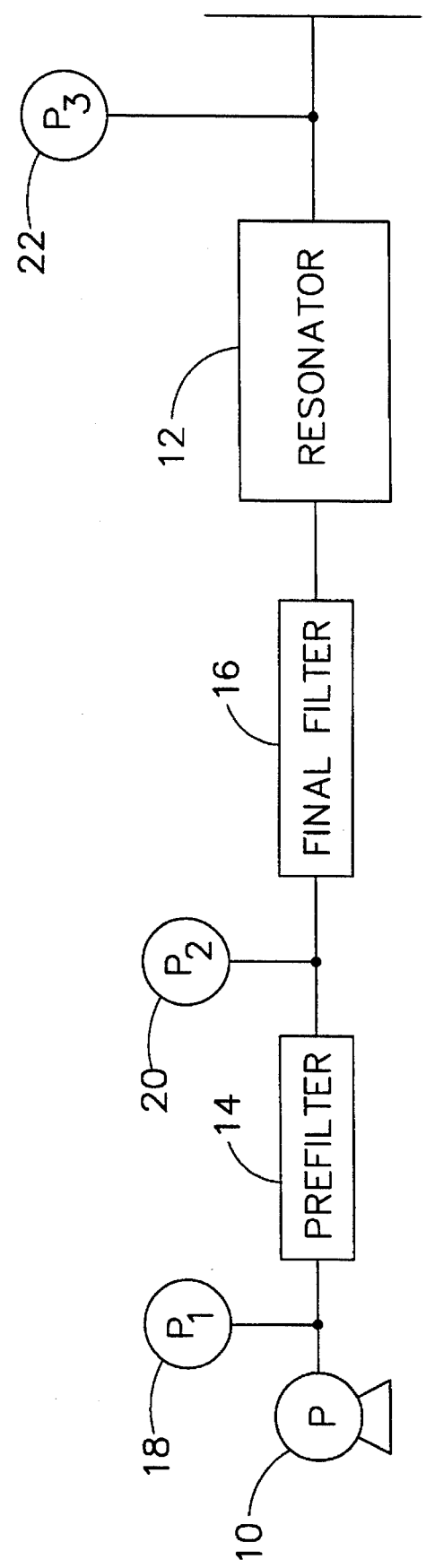
FIG. 1 illustrates a block diagram set up for circulating ink through a printhead resonator.
Figure 2:
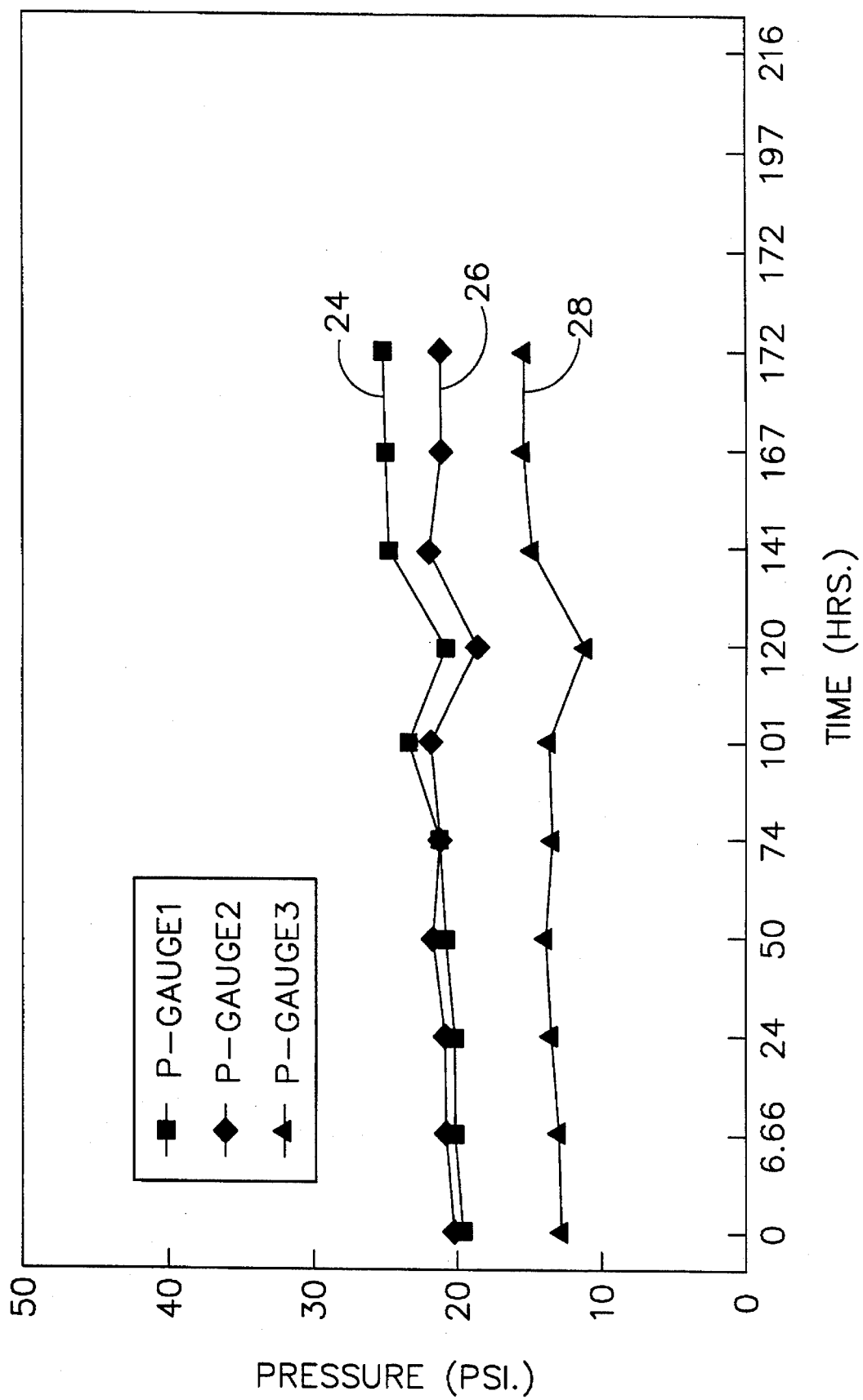
FIG. 2 illustrates a graph showing runnability of a filtered pigment dispersion, using the set up of FIG. 1.

Referring now to FIG. 1, a set up for circulating ink, using pump 10, through a printhead resonator 12 is illustrated. By utilizing a conventionally used prefilter 14 and a final printhead filter 16 in series before the resonator 12, runnability through the printhead resonator 12 could be extended up to 100 hours, as illustrated by the graph of FIG. 2 and determined using pressure gauges 18, 20, and 22. Graphical representation line 24 indicates the time in hours that clogging is observed by pressure gauge 18 of FIG. 1; graphical representation line 26 indicates the time in hours that clogging is observed by pressure gauge 20 of FIG. 1; and graphical representation line 28 indicates the time in hours that clogging is observed by pressure gauge 22 of FIG. 1. As can be seen in FIG. 2, after approximately 100 hours, filter clogging (shown graphically) and severe crooked jets (determined visually) are observed. The ink formulation of the ink used in FIG. 2 is comprised of carbon dispersion and water, only.

In developing the ink of the present invention, several Examples were considered and tested.

PREPARATION OF INK

Example 1

The following is one embodiment of an ink prepared during development of the pigmented ink of the present invention.

| Ink Formulation | % by Weight |
| --- | --- |
| Orient Black 144 Carbon Dispersion (21%) | 23.3 |
| Surfynol TGE | 0.3 |
| Polypropylene Glycol - 425 | 4.0 |
| Water | 72.4 |
| | 100.0 |

Figure 3:
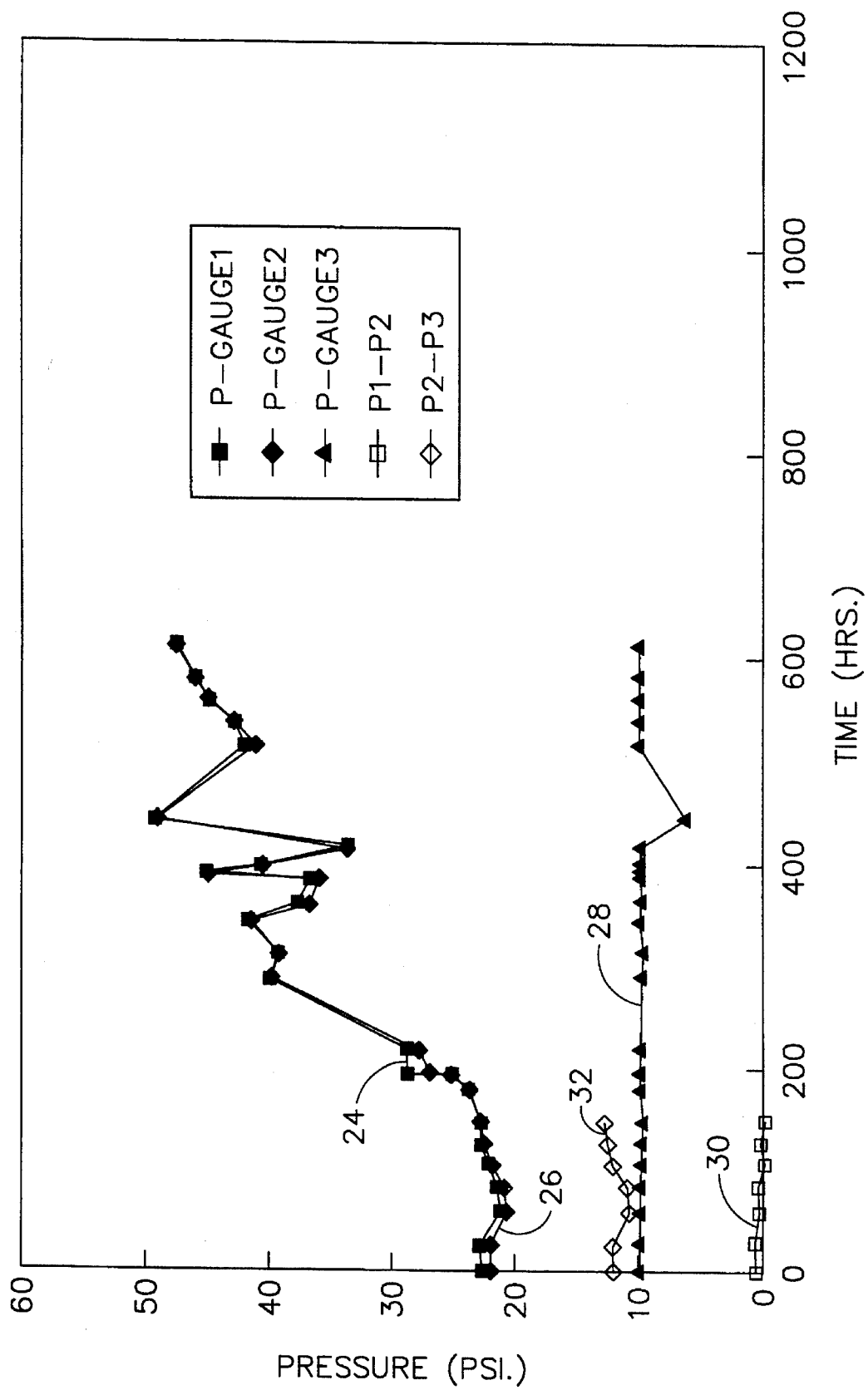
FIG. 3 illustrates a graph showing runnability of an ink composition according to Example 1, using the set up of FIG. 1.

Addition of a conventional humectant such as, for example, polypropylene glycol molecular weight 425, and a surfactant such as, for example, Surfynol TGE, can further improve runnability through the printhead resonator 12 up to 600 hours, as indicated in the graph of FIG. 3. The polymeric surfactant utilized to disperse pigment can be any suitable surfactant, such as, for example, a polymeric surfactant comprised of homopolymer or a copolymer of acrylates. Again, as in FIG. 2, graphical representation line 24 indicates the time in hours that clogging is observed by pressure gauge 18 of FIG. 1; graphical representation line 26 indicates the time in hours that clogging is observed by pressure gauge 20 of FIG. 1; and graphical representation line 28 indicates the time in hours that clogging is observed by pressure gauge 22 of FIG. 1. Graphical representation lines 30 and 32 indicate the pressure measured at gauge 18 minus the pressure measured at gauge 20, and the pressure measured at gauge 20 minus the pressure measured at gauge 22, respectively.

When the ink composition was formulated as above, the ink was used in a continuous ink jet printer, such as the type manufactured by Scitex Digital Printing, Inc., in Dayton, Ohio, to test jet straightness and start up. Surfynol TGE was mixed with water and then added to Orient Black dispersion dropwise while continuously stirring the dispersion. The resulting mixture was subsequently stirred for approximately 15 minutes. Finally, polypropylene glycol-425 was added and allowed to mix for another approximately 15 minutes. The resulting ink was then filtered through depth and 1.2µ membrane filter.

The ink formulated according to Example 1 was run through an Ektajet printer as well as an Ektajet printhead resonator, such as are manufactured by Scitex Digital Printing, Inc., in Dayton, Ohio. Although ink could be run for a short period, restart after stopping circulation could not be achieved without manually removing the printhead and cleaning by ultrasonification. Furthermore, over a long period, clogging of the prefilter 14 and the final printhead filter 16 was observed. This is illustrated by the graphical representation of FIG. 3, wherein clogging of the jets occurred after approximately 200 hours.

Unfortunately, two major limitations remained, even after the addition of a conventional humectant and a surfactant to the water and carbon dispersion. One, after stopping the printer, restart could not be achieved at all without manual removal of the printhead and subsequent cleaning by ultrasonification. Two, the pressure during circulation at the pump 10 gradually increased to unacceptable levels due to clogging of the prefilter 14 and/or the final printhead filter 16.

Example 2

In an effort to overcome the problems associated with the ink described in Example 1, the ink of Example 1 was modified by increasing pH by using a base. The present invention specifically relates to elimination of the limitations associated with the ink formulated in accordance with Example 1. The aqueous pigmented ink modified in accordance with the present invention of Example 2 was made as follows:

| Ink Formulation | % by Weight |
| --- | --- |
| Orient Black 144 Carbon Dispersion | 13.95 |
| Surfynol TGE | 0.30 |
| Polypropylene Glycol - 425 | 4.0 |
| Dimethyl Ethanol Amine | 1.2 |
| Water | 80.55 |
| | 100.0 |

In Example 2, Surfynol TGE was mixed with 75 parts of water and added to the Orient Black dispersion dropwise while continuously stirring the dispersion. The resulting mixture was stirred for an additional approximately 15 minutes. A base of Dimethyl Ethanol Amine, although any of a multitude of bases may be used, was mixed with the remaining 5.55 parts of water and added dropwise to the above mixture while continuously stirring. Finally, polypropylene Glycol-425 was added and allowed to mix for approximately 15 minutes. The prepared ink was filtered through depth and 1.2µ membrane filter.

The ink formulated in accordance with the present invention as defined in Example 2 was also run through an Ektajet printer as well as Ektajet printhead resonator, such as are manufactured by Scitex Digital Printing, Inc., in Dayton, Ohio. All start-ups brought the ink jet system to a ready mode on the initial start-up attempt, without any manual intervention. Additionally, there was no clogging of filters 14 and 16 observed for over 1200 hours in the printhead resonator 12.

For good automated start-up, in conventional dye-based inks, the dyes used are water soluble to achieve maximum dried ink redissolvability. However, due to this water solubility, the ink shows poor waterfastness. In some dye-based inks, if improved dried ink redissolvability is required, then the problem to be addressed is that of improving redissolvability. However, in pigmented inks, pigment is actually dispersed rather than dissolved. Hence, the problem to be addressed is completely different than that for dye-based inks. That is, the problem to be addressed for pigmented inks is how to achieve excellent ink redispersibility within a short time period, usually within 1-2 minutes, without any mechanical agitation.

In accordance with the teachings of the present invention, dried ink redispersibility/charge plate deposit redispersibility of aqueous pigmented ink could be improved by raising the pH of the ink. By raising pH of the ink, for example, between 9 and 12, time required for dried ink redispersibility is reduced from greater than 10 minutes to an acceptable 1-2 minutes. The present invention, then, results in significant improvement in machine runnability. Raising the pH to a value greater than 12 can require that the resultant product be labeled as corrosive. Raising the pH to a value less than 9 results in only partial improvement in the machine runnability. Therefore, the preferred range for the pH is between 9 and 12.

Figure 4:
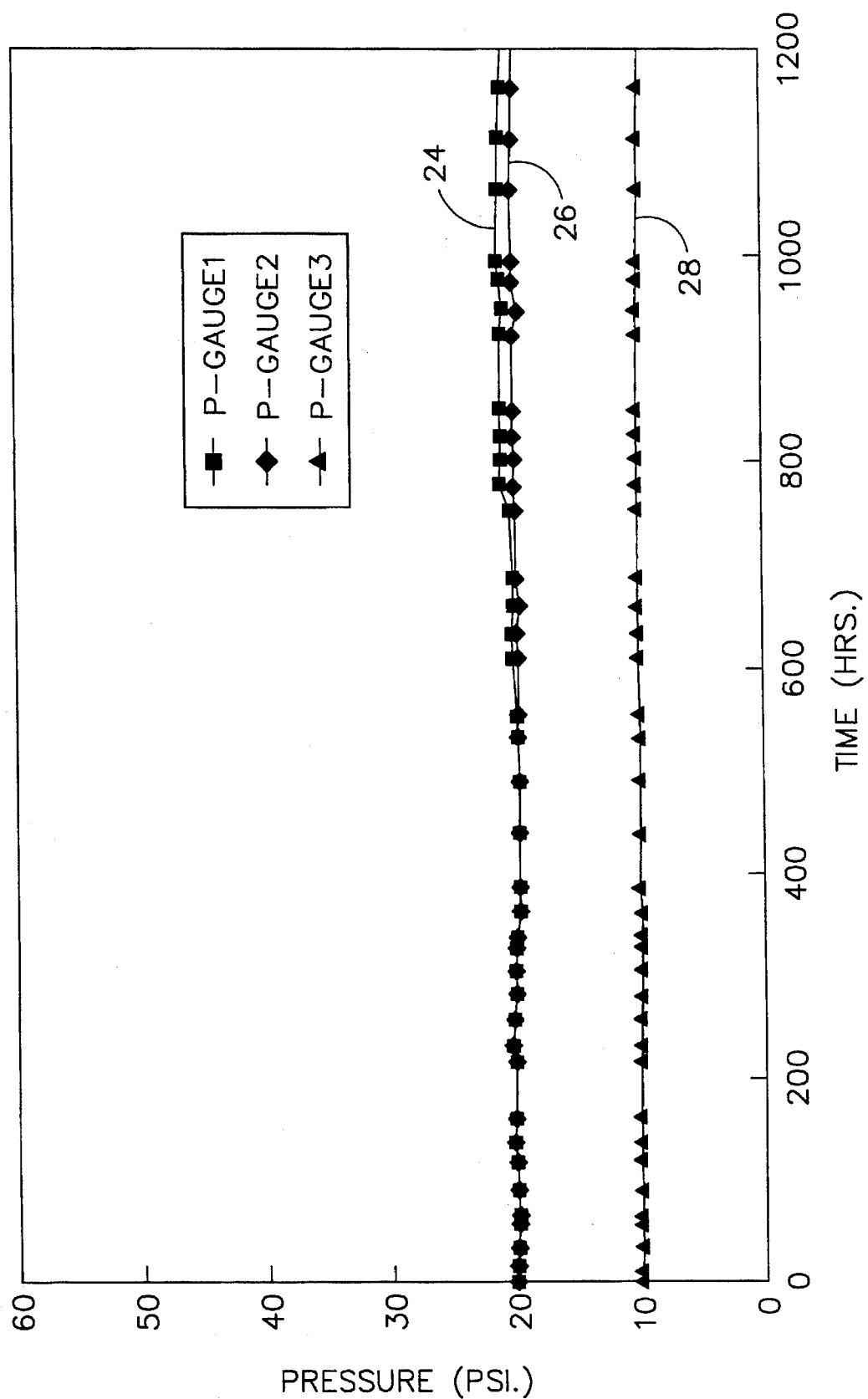
FIG. 4 illustrates a graph showing runnability of an ink composition according to Example 2, using the set up of FIG. 1.

Referring now to FIG. 4, an aqueous pigmented ink modified in accordance with the present invention can be run for more than 1200 hours without any clogging of the filters. Additionally, the ink jet printing system can be started after having been stopped, without any manual intervention, typically within five minutes. Again, as in FIG. 2, graphical representation line 24 indicates the time in hours that clogging is observed by pressure gauge 18 of FIG. 1; graphical representation line 26 indicates the time in hours that clogging is observed by pressure gauge 20 of FIG. 1; and graphical representation line 28 indicates the time in hours that clogging is observed by pressure gauge 22 of FIG. 1.

The improvement in dried ink redispersibility achieved with the present invention is clear for all dispersions made by non-ionic or anionic surfactantso For pigment dispersions, including but not limited to Orient Black 144, Hostafine T, Omnicryl W-7800, and DuPont experimental dispersion, improvement in dried ink redispersibility is achieved with the present invention. Further, any base including well known inorganic bases such as sodium hydroxide or slow evaporating organic amines can be used for raising pH. Thus, improvement in redispersibility, using the pigmented ink according to the present invention, is independent of the type of pigment as well as the type of base used for raising pH. The improvement in dried ink redispersibility is achieved for all typical materials, such as, but not limited to, sodium hydroxide, Triethanol Amine, 3-Amino Propanol, Dimethanol Amine, and Dimethyl Ethanol Amine.

Raising the pH of the ink is achieved by using a base in the formulation of the ink. In a preferred embodiment of the present invention, slower evaporating amines are used as the base for raising pH so as to maintain pH while running the machine for long hours.

The ink jet composition according to the present invention comprises a liquid vehicle, a pigment, and a base for raising pH. The base is preferably an amine. The pigment is dispersed in an aqueous medium using a polymeric surfactant. The pigment preferably comprises carbon black and is present in an amount of from about 1% to about 20% by weight. Finally, the pigment has an average particle size of less than 0.5 microns. The liquid vehicle can be selected from the group consisting of a wetting agent, a biocide, a corrosion inhibitor, a glycol, a water miscible cosolvent, deionized water and mixtures thereof. The liquid vehicle is preferably selected from the group consisting of a wetting agent, a biocide, deionized water, and mixtures thereof.

Example 3

Dried ink redispersibility of the inks described in Examples 1 and 2 were measured as follows: 1 gm of ink was dried in a polyethylene dish for a period of 24 hours. Subsequently, 1 gm of ink was added to this dried ink and gently swirled holding the polyethylene dish. The time required to redisperse the dried ink was measured, and the following table shows results.

| Ink | pH | Dried Ink Redispersibility |
| --- | --- | --- |
| Example 1 | 7.80 | >10 minutes |
| Example 2 | 10.25 | 1–2 minutes |

As is clear from the results in Example 3, the process according to the present invention achieves essential dried ink redispersibility/charge plate deposit redispersibility to gain improved machine runnability. By raising pH of the ink between 9 to 12, dried ink redispersibility is reduced from greater than 10 minutes to between 1–2 minutes without any mechanical agitation.

Example 4

Alternative bases were evaluated by making inks using the procedure described in the above mentioned Example 2, except that Dimethyl ethanol amine was substituted by other bases as described in the following table. The table also shows corresponding pH values and dried ink redispersibility.

| Base | pH | Dried Ink Redispersibility |
| --- | --- | --- |
| Sodium Hydroxide | 10.07 | 1 minute |
| Triethanol Amine | 9.4 | 1–2 minute |
| Diethanol Diamine | 10.37 | 2–3 minute |
| 3-Amino Propanol | 10.37 | 1–2 minute |

As illustrated in the table of Example 4, all evaluated bases provided improvement in dried ink redispersibility. As expected, significant improvement was also seen in machine runnability.

As will be obvious to anyone skilled in the art, the ingredients in all four examples above are commercially available. It is also understood and known in the art that redispersibility and waterfastness are ink specific, resulting in variations in the amount of redispersibility and waterfastness achieved, depending on the actual ink composition. The pigment ink composition of the present invention is particularly adaptable for incorporation into an ink jet printing apparatus for forming images by causing the ink to be expelled in droplets onto a substrate, thereby generating an image on the substrate.

Industrial Applicability and Advantages

The present invention is useful in the field of ink jet printing, and has the advantage of formulating a modified pigmented ink for use in ink jet printing ink which has increased waterfastness. The present invention has the further advantage of providing a process by which essential dried ink redispersibility/charge plate deposit redispersibility is achieved to gain improved machine runnability. Finally, the present invention provides an advantage in that dried ink redispersibility time is reduced from greater than 10 minutes to between 1–2 minutes without any mechanical agitation, thereby providing acceptable machine runnability.

The invention has been described in detail with particular reference to certain preferred embodiments thereof, but it will be understood that modifications and variations can be effected within the spirit and scope of the invention.

I claim:

1. An ink jet ink composition for use in a continuous ink jet printing system comprising a liquid vehicle, a pigment, and a base for raising pH to redisperse dried ink film.

2. An ink jet ink composition as claimed in claim 1 wherein the pigment is dispersed in an aqueous medium using a polymeric surfactant.

3. An ink jet ink composition as claimed in claim 1 wherein the pigment comprises carbon black.

4. An ink jet ink composition as claimed in claim 1 wherein the pigment is present in an amount of from about 1% to about 20% by weight.

5. An ink jet ink composition as claimed in claim 1 wherein the pigment has an average particle size of less than 0.5 microns.

6. A process for generating images which comprises incorporating into an ink jet printing apparatus the ink composition of claim 1 and forming images by causing the ink to be expelled in droplets onto a substrate, thereby generating an image on the substrate.

7. A process as claimed in claim 6 wherein the ink contains a pigment dispersed in an aqueous medium using a polymeric surfactant.

8. A process as claimed in claim 6 wherein the pigment is carbon black.

9. A process as claimed in claim 6 wherein the pigment is present in an amount of from about 1% to 20% by weight.

10. An ink jet composition as claimed in claim 1 wherein the liquid vehicle is selected from the group consisting of a wetting agent, a biocide, deionized water, and mixtures thereof.

11. An ink jet composition as claimed in claim 10 wherein the liquid vehicle is selected from the group consisting of a wetting agent, a biocide, a corrosion inhibitor, a glycol, a water miscible cosolvent, deionized water and mixtures thereof.

12. A method for formulating modified inks for continuous ink jet printers, the method comprising the steps of:

mixing a polymeric surfactant, water, and a carbon dispersion to create a carbon dispersion mixture;

mixing a base with the carbon dispersion mixture to create a base mixture;

adding a conventional humectant to the base mixture to make an aqueous pigmented ink jet ink.

13. A method as claimed in claim 12 wherein the base comprises an amine.

14. A method as claimed in claim 12 wherein the pigment is present in an amount of from about 1% to about 20% by weight.

15. A method as claimed in claim 12 wherein the pigment has an average particle size of less than 0.5 microns.

16. A method as claimed in claim 12 wherein the polymeric surfactant comprises homopolymer or a copolymer of acrylates.

17. A method as claimed in claim 12 wherein the conventional humectant comprises polypropylene glycol.

\* \* \* \* \*